(12) United States Patent
Ma et al.

(10) Patent No.: US 8,876,950 B2
(45) Date of Patent: Nov. 4, 2014

(54) TECHNOLOGY AND DEVICE FOR UNIFORM DISTRIBUTION OF WATER FILM ON SOLID COLLECTING PLATE

(71) Applicants: Qufu Shanda Energy and Enviornment Co., Ltd., QuFu (CN); Shandong University, JiNan (CN)

(72) Inventors: Chunyuan Ma, JiNan (CN); Jingcai Chang, JiNan (CN)

(73) Assignees: Shandong University, Jinan (CN); Qufu Shanda Energy and Environment Co., Ltd., Qufu (CN)

( * ) Notice: Subject to any disclaimer, the term of this patent is extended or adjusted under 35 U.S.C. 154(b) by 0 days.

(21) Appl. No.: 13/981,134

(22) PCT Filed: Dec. 18, 2012

(86) PCT No.: PCT/CN2012/001710
§ 371 (c)(1),
(2), (4) Date: Jul. 23, 2013

(87) PCT Pub. No.: WO2014/085949
PCT Pub. Date: Jun. 12, 2014

(65) Prior Publication Data
US 2014/0150718 A1   Jun. 5, 2014

(30) Foreign Application Priority Data
Dec. 5, 2012 (CN) .......................... 2012 1 0516014

(51) Int. Cl.
*B03C 3/16* (2006.01)
*B03C 3/34* (2006.01)
*B01D 1/00* (2006.01)
*B01D 45/00* (2006.01)
*B01D 24/00* (2006.01)

(52) U.S. Cl.
CPC ... *B03C 3/34* (2013.01); *B01D 1/00* (2013.01); *B01D 45/00* (2013.01); *B01D 23/00* (2013.01)
USPC ................. 95/65; 95/75; 96/45; 96/48; 96/52

(58) Field of Classification Search
CPC .......... B01D 1/00; B01D 23/00; B01D 45/00; B01D 61/00
USPC ............................................................. 96/52
See application file for complete search history.

(56) References Cited

U.S. PATENT DOCUMENTS

2006/0207428 A1 * 9/2006 Ibe et al. .......................... 96/52

FOREIGN PATENT DOCUMENTS

CN   2515630 Y * 10/2002 ................ F28C 1/00
CN   201235264 Y   5/2009

OTHER PUBLICATIONS

Mar. 21, 2013 Written Opinion issued in International Patent Application No. PCT/CN2012/001710 (with translation).

*Primary Examiner* — Duane Smith
*Assistant Examiner* — Joubert X Glover
(74) *Attorney, Agent, or Firm* — Oliff PLC

(57) ABSTRACT

Disclosed is technology and device for uniform distribution of water film on solid collecting plate used on a wet electrostatic precipitator (ESP). The device includes clamping plate fastening bolts, suspended clamping plates, a water distribution pipe, guide vanes, collecting plate, a limiter, a two-way limited fixed axis and a double arming bolt. The surfaces of the solid collecting plate are subjected to coating pretreatment, the upper parts of the collector are connected with the water distribution pipe, and the 45° guide vanes are twisted; a corrugated diversion with the width of 5 to 8 mm is adopted; stainless steel pipes are crosswise welded, water distribution holes are formed at the water distribution pipe, the distribution pipe is connected with an external water tank, and the inlet quantity of the water is controlled by a PLC; the collectors are placed vertically, and the ESP contains a set of sharp discharge electrodes.

12 Claims, 4 Drawing Sheets

TECHNOLOGY AND DEVICE FOR UNIFORM DISTRIBUTION OF WATER FILM ON SOLID COLLECTING PLATE

FIELD OF THE INVENTION

The invention belongs to the field of atmospheric pollutant control and treatment, and in particular, relates to the technology and device for uniform distribution of a water film on a solid collecting plate of a wet electrostatic precipitator (ESP).

BACKGROUND OF THE INVENTION

At present, 95 percent of coal-fired power plants adopt electric precipitators, mainly including dry electrostatic precipitators (ESPs) and wet electrostatic precipitators (ESPs). It is well known that the dry wet electrostatic precipitators have a very limited capability of removing superfine particulate matters, and massive fine particles and fly ash still enter the environment after electrostatic precipitation to cause pollution and affect human health. The operating efficiency of the electrostatic precipitators is mainly affected by many factors, such as smoke characteristics, operating conditions and equipment conditions, wherein for traditional solid collecting plate materials, "secondary carrying" caused by the traditional mechanical vibrating dust removal mode is one of the important reasons for relatively low removal efficiency of superfine particulate matters.

The wet electrostatic precipitators can effectively avoid secondary flying of dust by adopting a water film dust-collecting mode, has high corona current and obvious particle coagulation effect, has obvious technical advantages in the aspect of discharge control of the superfine particulate matters, and accordingly are being gradually applied in power plants. However, the current wet electric electrostatic precipitators generally adopt solid collecting plates, and the water film is liable to form channels on the surfaces of the collecting plates under the actions of machining flatness deviation and surface tension of a solid material under the same flushing water quantity, so that the following problems still exist in the dust removal technology: water resource waste caused by high flushing water quantity in flushing the surfaces thoroughly, "spark discharge" fault caused by "dry spots" formed by non-uniform residual dust on the water films on the surfaces of the collecting plates, defects of the halt flushing operation adopted for most equipment, and the like.

SUMMARY OF THE INVENTION

The present invention provides the technology and device for uniform distribution of a water film on a solid collecting plate by adopting a specific surface coating pretreatment technology and designing a corresponding water film distribution structure based on solid collecting plates generally adopted in an electrostatic precipitators.

The present invention is realized as follows:

The device for uniform distribution of the water film on the solid collecting plate consists of clamping plate fastening bolts, suspended clamping plates, a water distribution pipe, guide vanes, collector fastening bolts, collecting plates, a limiter at the bottom of the collector, a two-way limited fixed axis and double arming bolts. The device is characterized in that the surfaces of the collecting plates are subjected to coating pretreatment by a hydrophilic agent; the 45° guide vanes are twisted on the upper parts of the collecting plates, a corrugated diversion with the width of 5 to 8 mm is rolled at the front ends of the collecting plates, stainless steel pipes are crosswise welded into a grid water distribution pipe network, and water distribution holes are sequentially and densely distributed on the lower parts of the stainless steel pipes; the upper parts of the collecting plates are connected with the water distribution pipe through suspended clamps, and the lower parts of the collecting plates are fixed on a collecting plate lower fixing beam; and an electrostatic field passage is formed by adopting the collecting plates with the same width. The technology for uniform distribution of the water film on the solid collecting plate is characterized in that the surface energy is improved after the surfaces of the collecting plates are subjected to coating pretreatment by a hydrophilic agent, and liquid can be spread on the surfaces of the collecting plates from different parts to quickly form a thin and uniform water film; water flows out of the water distribution pipe and enters the upper parts of the collecting plates through the 45° twisted guide vanes, thus completing primary uniform distribution of the flushing water; the liquid subjected to the primary uniform distribution enters the corrugated diversion at the front ends of the collecting plates from the front and the back of the upper parts of the collecting plates respectively, and the water is uniformly arranged on the upper parts of the collecting plates, thus completing secondary uniform distribution of the flushing water; the collecting plates are endowed with surface self-cleaning property through the surface coating pretreatment, and a dust layer is not firmly attached to the surfaces of the positives and is easily flushed away by the surface water film, thus achieving thorough dust removal; and a smoke flow is in concurrent contact with the water film to produce a friction force, so that the accumulated dust flushing force of the water film is enhanced. The collecting plates of the invention are solid collecting plates subjected to surface coating pretreatment, 45° guide vanes are twisted on the upper parts of the collecting plates, a rolled corrugated diversion with the width of 5 to 8 mm is adopted at the front ends of the collecting plates, and the upper parts of the collecting plates are connected with the water distribution pipe through six suspended clamps. The lower parts of the collecting plates are fixed on a collecting plate lower fixing beam, stainless steel pipes are crosswise welded into a grid water distribution pipe network, water distribution holes are densely distributed on the lower part of the water distribution pipe, the lower part of the water distribution pipe is connected with an external water tank, and the flow rate of the water distribution pipe is controlled by a PLC. An electrostatic field passage is formed by adopting the collecting plates with the same width, the upper and lower parts of those beams loaded a discharge electrode are suspended by insulated boxes and insulated from a shell, and dust hoppers are arranged at the lower parts of the collecting plates.

The technology for uniform distribution of the water film on the solid collecting plate mainly comprises the following steps:

(1) the surface energy is improved after the surfaces of the positives are subjected to surface coating pretreatment, and liquid can be spread on the surfaces of the collecting plates from different parts to quickly form a thin and uniform water film;

(2) water flows out of the water distribution pipe and enters the upper parts of the collecting plates through the 45° twisted guide vanes, thus completing primary uniform distribution of the flushing water; the liquid subjected to the primary uniform distribution enters the corrugated diversion at the front ends of the collecting plates from the front and the back of the upper parts of the collecting plates respectively, and the water is uniformly arranged on the upper parts of the collecting plates, thus completing secondary uniform distribution of the flushing water; quick formation of a uniform water film on the surfaces of the collecting plates can be realized under the condition of low water supply rate in the two uniform flow processes; and (3) the collecting plates are endowed with surface self-cleaning property through the surface coating pretreatment, the dust layer is not firmly attached to the surfaces of the collecting plates and is easily flushed away by the surface water film, thus achieving thorough dust removal; and smoke passes through the flaky collecting plates at the speed of 1 to 5 m/s, the smoke flow is in concurrent contact with the water film to produce a friction force, so that the accumulated dust flushing force of the water film is enhanced, and the "secondary flying" phenomenon in the traditional mechanical dust removal process is eliminated.

The specific operating process is as follows: smoke is uniformly treated by the guide vanes at the inlet of a shell and then enters a wet electrostatic precipitator; a water film is arranged on the surfaces of the solid collecting plates, and the upper parts of the collecting plates are positioned by a collecting plate upper supporting beam and a supporting beam limiting trapezoidal plate; each collecting plate module is subjected to water distribution quantity adjustment by the PLC; the spreading speed of the film distribution liquid on the surfaces of the collecting plates is improved by using a hydrophilic layer on the surfaces of the collecting plates, so that a uniform and thin water film is quickly formed on the surfaces of the collecting plates; a discharge electrode is put in the center in a collecting plate passage, the collecting plates and the discharge electrode form a high-voltage non-uniform electric field, the discharge electrode ionizes the smoke nearby to form ions and electrons with charges, and the ions and the electrons collide with superfine particulate matters, so that the superfine particulate matters are charged; after reaching the surfaces of the collecting plates under the action of an electrostatic field, the superfine particulate matters are attached to the water film on the collecting plates under the comprehensive action of an electrostatic force, a mechanical force, a molecular force and a liquid surface tension, the superfine particulate matters absorb moisture and are then swollen and agglomerated to form irregular particulate matters with relatively large diameters, and an adsorption effect is created to adsorb subsequent superfine particulate matters approaching the collecting plates, and finally, the settled dust forms a densely accumulated pattern, thus effectively preventing secondary flushing carrying of smoke flow; the smoke passes through an electrostatic field passage formed by the collecting plates at the speed of 1 to 5 m/s, the smoke flow is in concurrent contact with the water film to provide a downward friction force along the water film, and the surfaces of the collecting plates are endowed with self-cleaning property by hydrophilization, so that the adhesive force of the dust layer on the surfaces of the collecting plates is reduced; and the dust layer is not firmly attached to the surfaces of the positives and is easily flushed away by the surface water film, so that thorough dust removal is realized, and "secondary flying" is avoided.

According to the technology and device for uniform distribution of the water film on the solid collecting plate provided by the invention, uniform water film distribution, low water consumption, continuous charged flushing, thorough fly ash flushing without secondary flying and long-term continuous and reliable operation can be realized on the surfaces of the traditional collecting plates through surface coating pretreatment of the solid collecting plates. Compared with the traditional technology of uniform distribution of a water film on a collecting plate, the present invention has the advantages of excellent corrosion resistance, low flushing water quantity, uniform surface water film, stable electric field, continuous charged flushing, safe, reliable and stable operation and the like, and efficient removal of fly ash particulate matters and thorough dust removal are realized at the same time. The invention meets the requirements in atmospheric pollutant discharge standard for power plants, and has a wide market application prospect.

Figure 1:
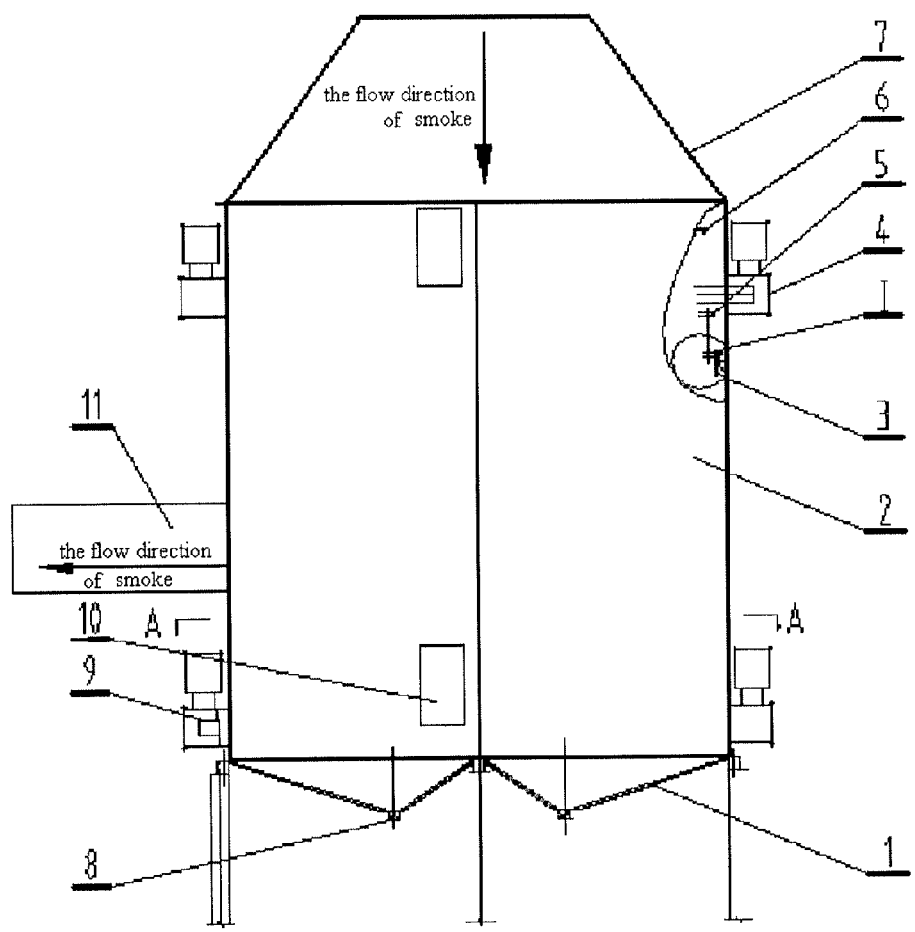
FIG. 1 is a schematic diagram of the wet electrostatic precipitator structure.

In the drawings, 1, dust hopper; 2, shell; 3, positive water film distribution device; 4, upper insulated box; 5, negative pole line; 6, spray pipe; 7, upper end enclosure; 8, blow-off communicating pipeline; 9, lower insulated box; 10, manhole door; 11, smoke outlet; 12, clamping plate fastening bolt; 13, suspended clamping plate; 14, water distribution pipe; 15, guide vane; 16, collector fastening bolt; 17, collecting plate; 18, limiter at the bottom of the collector; 19, two-way limited fixed axis; 20, double arming bolt; and 21, corrugated diversion.

DETAILED DESCRIPTION OF THE EMBODIMENTS

Figure 2:
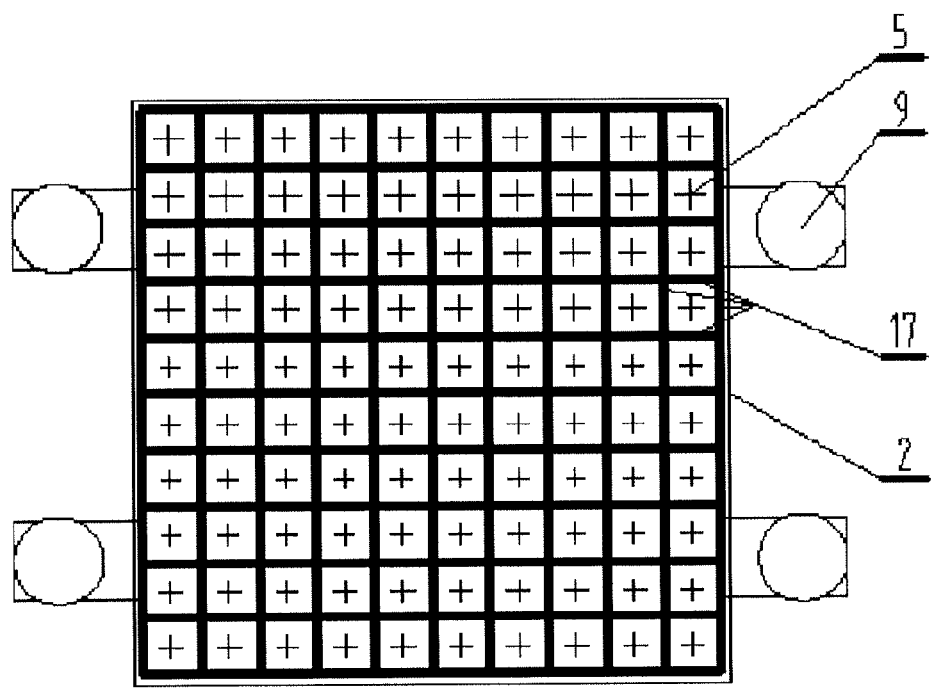
FIG. 2 is a sectional schematic diagram of the wet electrostatic precipitator along A-A.
Figure 3:
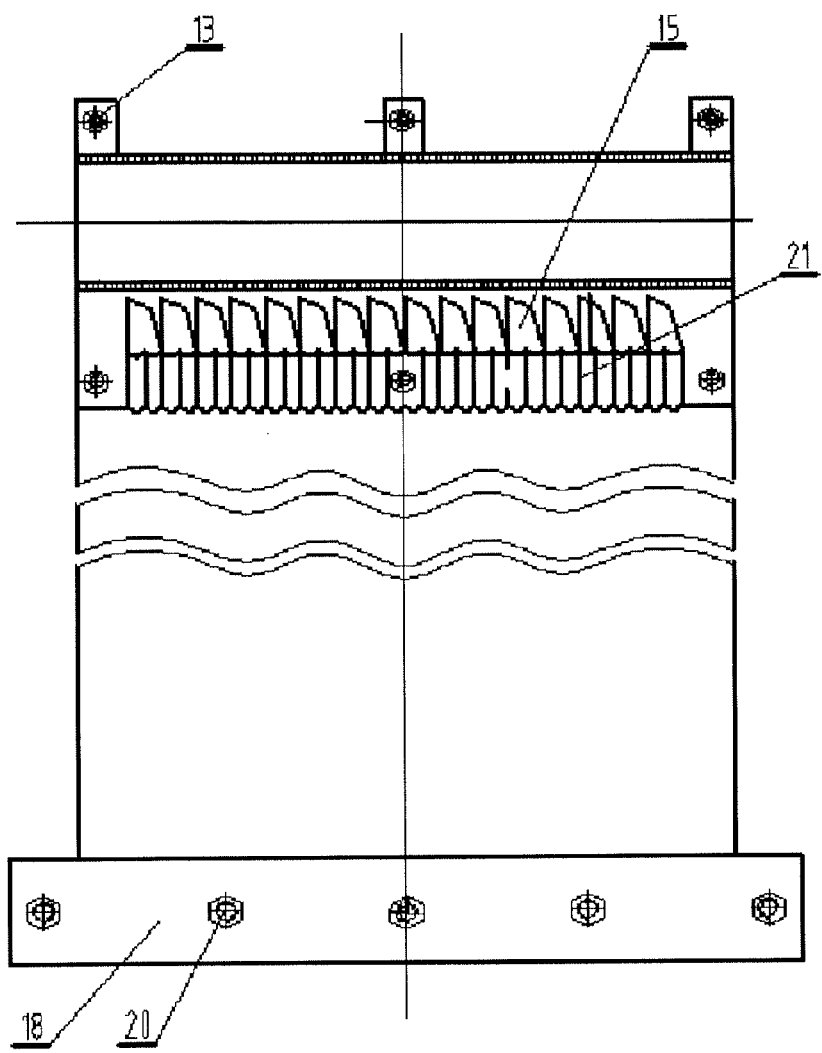
FIG. 3 is a front view of the device for uniform distribution of the water film on the solid collecting plate.
Figure 4:
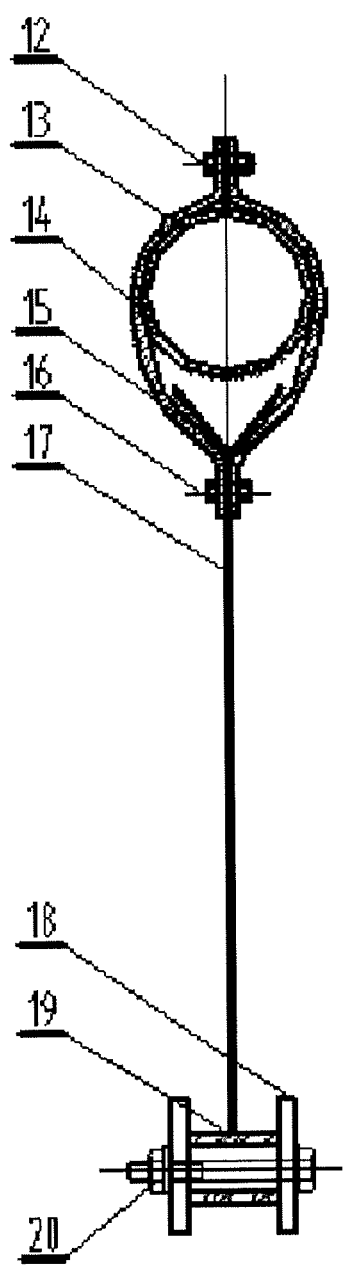
FIG. 4 is a side view of the device for uniform distribution of the water film on the solid collecting plate.

An optimal specific implementing way of the invention is provided below with reference to FIG. 1, FIG. 2, FIG. 3 and FIG. 4.

The technology and device for uniform distribution of the water film on the solid collecting plate are realized through a device as shown in FIG. 1, FIG. 2, FIG. 3 and FIG. 4. Smoke is homogenized through an upper end enclosure 7 in a flow state and then enters a shell 2; the smoke flows through the layer of a spray pipe 6 and then enters, through negative lines 5 suspended by an upper insulated box 4, a positive passage formed by a positive water film distribution device 3 consisting of clamping plate fastening bolts 12, suspended clamping plates 13, a water distribution pipe 14 and collector fastening bolts 16; the bottoms of the collecting plates 17 are fixed by a limiter at the bottom of the collector 18, a two-way limited fixed axis 19 and double arming bolts 20; the collecting plates are placed vertically; film distribution liquid flows out through small holes at the bottom of the water distribution pipe 14 and enters the upper parts of the collecting plates 17 through guide vanes 15 and a corrugated diversion 21, and the liquid is quickly spread on the surfaces of the collecting plates to form a uniform water film; in the device for uniform distribution of the water film on the solid collecting plate, the whole shell framework is formed by steel plates with the thicknesses of 6 mm, channel steel, stainless steel pipes and I-steel; a collecting plate upper supporting beam for fixing a collecting plate framework is formed by the I-steel; the collecting plates are made of a traditional collecting plate material, and the surfaces of the collecting plates produce hydrophilic property by adding a hydrophilic agent; the 45° guide vanes are twisted on the upper parts of the collecting plates to complete primary uniform distribution of water and prevent electric field instability caused by liquid splash; the rolled corrugated diversion with the width of 5 to 8 mm is adopted on the upper parts of the collecting plates, and secondary uniform distribution of the liquid is achieved in the corrugated trench; the collecting plate framework is formed by transversely and longitudinally arranging stainless steel pipes with the diameter of 50 mm at intervals of 300 to 500 mm, stainless steel pipes are crosswise welded into a grid water distribution pipe network, water distribution holes with the diameters of 1 to 2 mm are densely distributed on the lower part of the water distribution pipe, the lower part of the water distribution pipe is connected with an external water tank, and the flow rate of the water distribution pipe is controlled by a PLC; the upper parts of the collecting plates are connected with a round pipe with the diameter of 50 mm through six suspended clamps; the lower part of each suspended clamp is connected with the corresponding collecting plate by three M16 bolts; the lower part of each collecting plate is fixed on the collecting plate lower fixing beam by four M20 bolts; the I-steel is welded with the shell to form supporting devices for supporting the insulated boxes; an electrostatic field passage is formed by the collecting plates with the same width; the upper and lower parts of those beams loaded a discharge electrode are suspended by the insulated boxes and insulated from the shell; a manhole door with the size of 1200×800 mm is formed on the shell to facilitate entry of a maintainer; and dust hoppers are arranged at the lower parts of the collecting plates, a dust-water mixture is discharged from a blow-off pipeline and then enters a dust-water treatment system, and clean water is recycled.

The collecting plates 17 and the negative lines 5 are kept at a fixed collector interval and form a stable non-uniform high-voltage electric field; the negative lines 5 are suspended by the upper insulated box 4 and the lower insulated box 9 and insulated from the shell to prevent the phenomena of electricity leakage, short circuit and the like; when the device fails in operation, a maintainer enters from the manhole door 10 to carry out inspection and maintenance; when the smoke passes through the passage, formed by each collecting plate 17, from top to bottom, the negative lines 5 ionize the surrounding smoke to generate negative ions and electrons, and the negative ions and the electrons collide with superfine particles; after being charged, the particles move towards the surfaces of the collecting plates under the action of an electric field force and finally reach the surfaces of the collecting plates to complete an electrostatic adsorption technology, and the clean smoke is discharged to a chimney through an outlet 11; the water distribution quantity is adjusted by an adjusting valve of the positive water film distribution device 3 controlled by the PLC according to the dust accumulation degree on the surfaces of the collecting plates, the fly ash content at the inlet and the flushing condition; and by means of online adjustment on the thickness of the water film, the dust attached to the surfaces of the collecting plates is flushed into the dust hoppers 1, the dust-water mixture flows out through the blow-off pipeline 8 and then enters the dust-water treatment system, and the clean liquid formed after dust-water separation is recycled.

The invention claimed is:

1. A device for uniform distribution of a water film on a solid collecting plate, the device comprising:
    clamping plate fastening bolts,
    suspended clamping plates,
    a water distribution pipe,
    guide vanes,
    collecting plate collector fastening bolts,
    collecting plates,
    a limiter at the bottom of a collector,
    a two-way limited fixed axis and
    double arming bolts; wherein
        surfaces of the collecting plates have a hydrophilic property, which is imparted by subjecting the surfaces of the collecting plates to a coating pretreatment with a hydrophilic agent,
        45° guide vanes are twisted on the upper parts of the collecting plates,
        a corrugated diversion with the width of 5 to 8 mm is rolled at the front ends of the collecting plates,
        the water distribution pipe comprises stainless steel pipes that are crosswise welded into a grid water distribution pipe network,
        water distribution holes are distributed on the lower parts of the stainless steel pipes of the grid water distribution pipe network,
        the upper parts of the collecting plates are connected with the water distribution pipe through suspended clamps,
        the lower parts of the collecting plates are fixed on a collecting plate lower fixing beam, and
        an electrostatic field passage is formed by adopting the collecting plates with the same width.

2. A method for uniform distribution of a water film on a solid collecting plate of a wet electrostatic precipitator, the method comprising:
    improving a surface energy of surfaces of collecting plates by subjecting the surfaces of the collecting plates to a coating pretreatment with a hydrophilic agent to impart a hydrophilic property to the surfaces of the collecting plates such that an aqueous liquid can be spread on the surfaces of the collecting plates from different parts to form a thin and uniform aqueous film;
    completing a primary uniform distribution of water by flowing water out of a water distribution pipe such that it enters the upper parts of the collecting plates through 45° twisted guide vanes; and
    completing a secondary uniform distribution of the water by directing the water subjected to the primary uniform distribution to a corrugated diversion at the front ends of the collecting plates from the front and the back of the upper parts of the collecting plates respectively such that the water is uniformly arranged on the upper parts of the collecting plates, which generates the thin and uniform water film; wherein
        the coating pretreatment endows the surfaces of the collecting plates with a surface self-cleaning property such that any accumulated dust is capable of being flushed away by the water film.

3. The device for uniform distribution of the water film on the solid collecting plate of claim 1, wherein the upper parts of the collecting plates are connected with the water distribution pipe through six suspended clamps.

4. The device for uniform distribution of the water film on the solid collecting plate of claim 1, wherein the water distribution pipe is connected with an external water tank, and the flow rate of the water distribution pipe is controlled by a PLC.

5. The device for uniform distribution of the water film on the solid collecting plate of claim 1, further comprising beams loaded with a discharge electrode, wherein the upper and lower parts of the beams loaded with a discharge electrode are suspended by insulated boxes and insulated from a shell of a wet electrostatic precipitator structure.

6. The device for uniform distribution of the water film on the solid collecting plate of claim 1, further comprising dust hoppers arranged at the lower parts of the collecting plates.

7. A method for removing particulate matters from smoke, the method comprising:
    providing a wet electrostatic precipitator including the device of claim 1, wherein a discharge electrode is put in the center of each collecting plate passage, and the collecting plates and the discharge electrode form a high-voltage non-uniform electric field;
    directing smoke having particulate matters into the wet electrostatic precipitator;
    forming a water film on surfaces of the collecting plates, the surfaces of the collecting plates being coated with a hydrophilic agent, by flowing water out through small holes at the bottom of the water distribution pipe such that the water enters the upper parts of the collecting plates through guide vanes and a corrugated diversion;
    ionizing the particulate matters in the smoke via the discharge electrode to formed charged particulate matters; and
    directing the charged particulate matters toward the surfaces of the collecting plates via an electrostatic field.

8. A method of claim 7, wherein the upper parts of the collecting plates are positioned by a collecting plate upper supporting beam and a supporting beam limiting trapezoidal plate.

9. A method of claim 7, wherein the smoke passes through the electrostatic field passage formed by the collecting plates at the speed of 1 to 5 m/s.

10. A method of claim 7, wherein the smoke flow is in concurrent contact with the water film to provide a downward friction force along the water film.

11. A method of claim 7, wherein directing the charged particulate matters to the water film on the surfaces of the collecting plates via an electrostatic field forms a dust layer that is flushed away by the water film.

12. A method of claim 11, wherein the surfaces of the collecting plates are endowed with self-cleaning property that reduces the adhesive force of the dust layer on the surfaces of the collecting plates.

* * * * *

UNITED STATES PATENT AND TRADEMARK OFFICE
CERTIFICATE OF CORRECTION

PATENT NO.         : 8,876,950 B2                                              Page 1 of 1
APPLICATION NO.    : 13/981134
DATED              : November 4, 2014
INVENTOR(S)        : Chunyuan Ma et al.

It is certified that error appears in the above-identified patent and that said Letters Patent is hereby corrected as shown below:

On the Title Page

Item (71), please change the listing of Applicants from "Qufu Shanda Energy and Enviornment Co., Ltd., QuFu (CN); Shandong University, JiNan (CN)" to --Shandong University, JiNan (CN); Qufu Shanda Energy and Environment Co., Ltd., QuFu (CN)--.

Signed and Sealed this
Seventh Day of April, 2015

Michelle K. Lee
*Director of the United States Patent and Trademark Office*